UNITED STATES PATENT OFFICE.

LEWIS FRANCIS AND CYRUS H. LOUTREL, OF NEW YORK, N. Y., ASSIGNEES OF LEWIS FRANCIS.

IMPROVED COMPOSITION OF MATTER FOR PRINTERS' INKING-ROLLERS AND FOR OTHER PURPOSES.

Specification forming part of Letters Patent No. 41,887, dated March 8, 1864; Reissue No. 1,771, dated September 27, 1864; Reissue No. 1,885, dated February 28, 1865; Reissue No. 2,195, dated March 13, 1866.

*To all whom it may concern:*

Be it known that we, LEWIS FRANCIS and CYRUS H. LOUTREL, of the city, county, and State of New York, by virtue of an assignment from LEWIS FRANCIS, resting in us the exclusive right and title of Letters Patent for an Improved Composition of Matter, granted to LEWIS FRANCIS, March 8, 1864, for the purpose of obtaining a reissue of said patent, hereby declare that the following, in the language of the said LEWIS FRANCIS, is a full, clear, and correct description of the invention therein contained.

The nature of my invention consists in combining an alkali or alkalies or alkaline earths, or any of the compounds of alkalies or alkaline earths, with glue and glycerine to form a new and useful composition of matter for various purposes.

To enable those skilled in the arts to make and use my invention, I will proceed to describe the same.

In making my improved composition the ingredients are employed in about the following proportions: glue, fifteen (15) pounds; glycerine, thirty-two (32) pounds; borax, eight (8) ounces; ammonia, four (4) ounces. The glue is first soaked in water for about five (5) minutes, in order that it, (the glue,) when added to the glycerine, may be thoroughly incorporated with it. In many cases it is preferable to dissolve a certain quantity of lime in the water in which the glue is be soaked prior to soaking the glue therein. The glycerine is placed in a steam-kettle and heated to a temperature of about 200° Fahrenheit, and the glue and glycerine and alkali or alkalies or alkaline earths, or any of the compounds of alkalies or alkaline earths employed are united by gradually adding the glue and alkali or alkalies or alkaline earths or any of the compounds of alkalies or alkaline earths to the glycerine, the latter being kept well stirred until all the ingredients have been added and thoroughly incorporated with the glycerine. The composition thus formed may be cast into sheets or cakes of any desired form, ready as an article of commerce. The sheets or cakes are exposed to the air several days, in order that any water remaining in the composition may be thoroughly evaporated; or a vacuum-pan may be used for this purpose. By this last process all liability of the composition to shrink from the presence of water or moisture is obviated. The composition is then ready for sale or for remelting and casting into any desired form, and can be recast from time to time.

The improved composition thus made will be found particularly applicable to the manufacture of a superior article of printers' inking-rollers, to the lining of barrels or vessels for petroleum, fluids, and semi-fluids, as well as dry substances, for various purposes where elasticity is required, for taking of impressions in various ways, for the formation of molds and casts, and various other purposes.

I do not wish to be understood as intending to confine myself to the use of the ingredients specified in the proportions specified, as I am fully aware that these proportions may in some cases be advantageously varied. Neither do I intend to confine myself to the use of glue in the manufacture of the composition, as other gelatines may be substituted for glue, and various gums, resins, and bitumen may be employed in part, and the composition be thereby improved for some purposes, care being taken that when any one of the gums, resins, or bitumen is employed the same is first dissolved by its proper solvent before being added in the manufacture of the composition.

Having thus described my invention, what I claim as new, and desire to secure by Letters Patent, is—

Combining an alkali or alkalies or alkaline earths or any of the compounds of alkalies or alkaline earths with glue and glycerine to form a new and useful composition of matter for various purposes.

LEWIS FRANCIS.

In presence of—
WM. D. EVERIT,
A. SIDNEY DOANE.